(No Model.) 2 Sheets—Sheet 1.

A. BUCKMAN.
Baling Press.

No. 230,736. Patented Aug. 3, 1880.

Witnesses:
James A. Foote
Edwin G. Day

Inventor:
Alexr. Buckman,
by William H. Low
Attorney.

N. PETERS, PHOTO-LITHOGRAPHER, WASHINGTON, D. C.

(No Model.) 2 Sheets—Sheet 2.

A. BUCKMAN.
Baling Press.

No. 230,736. Patented Aug. 3, 1880.

Witnesses:
James H. Foot
Edwin G. Day

Inventor:
ALEX<sup>R</sup> BUCKMAN,
by
William N. Low
Attorney.

N. PETERS, PHOTO-LITHOGRAPHER, WASHINGTON, D. C.

UNITED STATES PATENT OFFICE.

ALEXANDER BUCKMAN, OF ALBANY, NEW YORK, ASSIGNOR OF ONE-HALF OF HIS RIGHT TO DAVID W. SEELEY, OF SAME PLACE.

BALING-PRESS.

SPECIFICATION forming part of Letters Patent No. 230,736, dated August 3, 1880.

Application filed May 12, 1880. (No model.)

*To all whom it may concern:*

Be it known that I, ALEXANDER BUCKMAN, of the city and county of Albany, and State of New York, have invented certain new and useful Improvements in Baling-Presses, of which the following is a specification.

My invention relates to that class of baling-presses wherein the material to be compressed is fed into one end of the pressing-chamber and the finished bale is ejected therefrom at the opposite end; and it consists, first, in combining with the plunger of the press a toggle-joint for imparting motion to the plunger, constructed and arranged as herein described, and provided with a detachable sweep for the application of animal power thereto, said sweep being adapted to move in opposite directions, so that when moved in either direction from one extremity of its movement to the opposite one the plunger will be moved forward to impart its pressure to the bale and again retracted to put the press in condition for receiving a fresh supply of material; secondly, in the mode herein described of bracing the main center-pin for the toggle-joint to the press-box; thirdly, in the mode herein described for operating the side retainers with a positive motion; fourthly, in the improved retaining device fixed in the top of the pressing-chamber, as herein set forth, for holding the material that is forced into the pressing-chamber, and consisting of a yielding spring-yoke provided with a roller and a serrated bar; fifthly, in the hinged top of the pressing-chamber, combined with an adjusting-screw for regulating the discharge-opening of the press; sixthly, in the improved separators herein described provided with spurs fixed in the slat-channels for retaining the binding-slats in place.

My invention also consists in combining with the pressing-chamber a detachable auxiliary baling-chamber for receiving the compressed bale as it is ejected from the pressing-chamber, and retaining the bale therein until additional slats and ties are secured thereto, said auxiliary chamber being constructed and arranged to operate as hereinafter specified.

Figure 1:
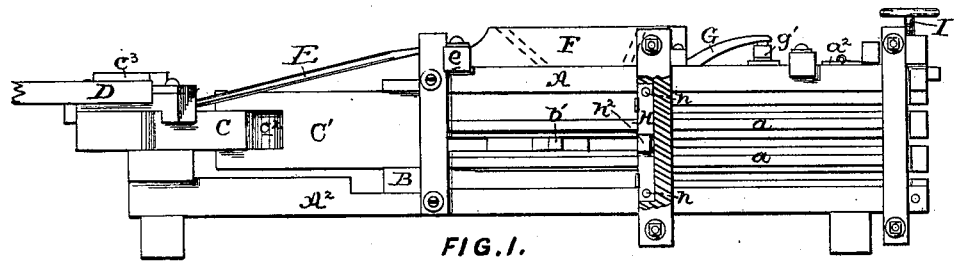
Figure 2:
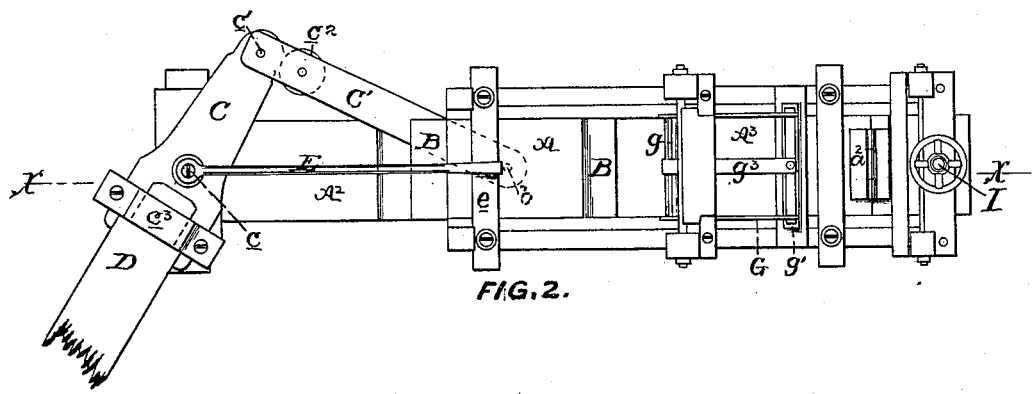
Figure 3:
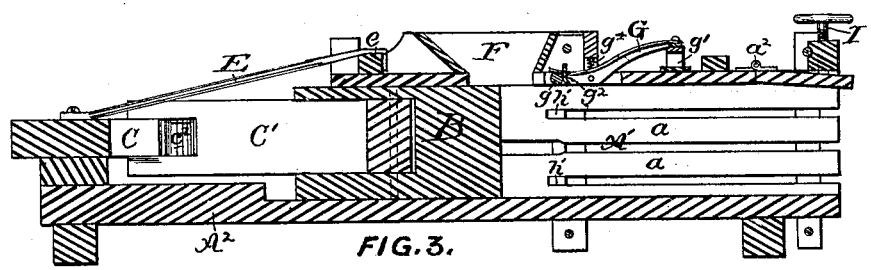
Figure 4:
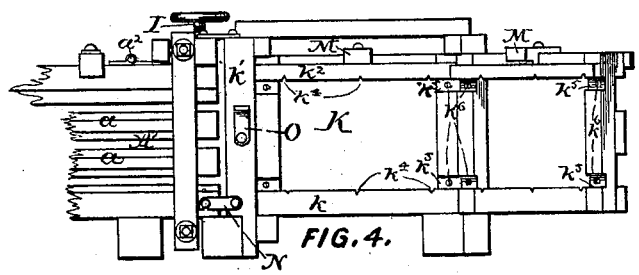
Figure 5:
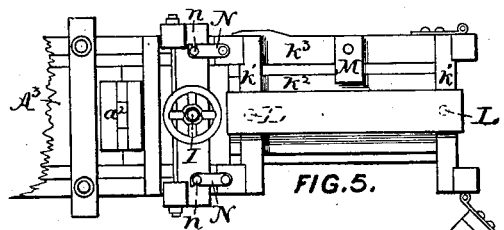
Figure 10:
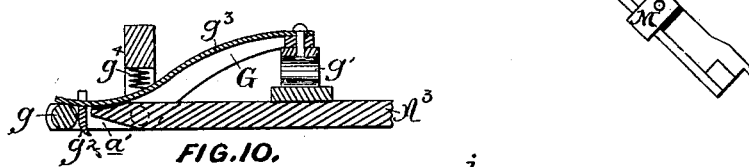
Figure 6:
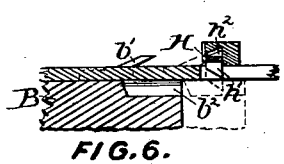
Figure 7:
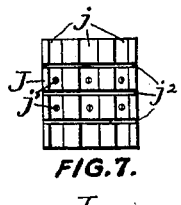
Figure 9:
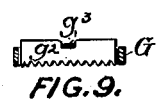
Figure 8:

In the accompanying drawings, which form a part of this specification, and to which reference is herein made, Figure 1 is a side elevation of my improved press with one of the side frames broken away to expose one of my side retainers; Fig. 2, a plan view of same with the feed-hopper removed; Fig. 3, a longitudinal section at the line $x\,x$ of Fig. 2; Fig. 4, a side elevation of my auxiliary baling-chamber attached to the discharge end of my press; Fig. 5, a plan view of Fig. 4; Fig. 6, a detached horizontal section of one of my side retainers and the hook-piece of the plunger for giving the said retainer its inward movement; Fig. 7, a front elevation of my improved separator; Fig. 8, a horizontal section of Fig. 7; Fig. 9, a detached detail of the serrated bar of the top retainer; and Fig. 10 an enlarged sectional view of the spring-yoke roller, serrated bar, and chamber.

As illustrated in the drawings, A is the box of the press, made at its receiving end with solid side walls, and at its discharging end the sides of the compressing-chamber are provided with horizontal slats $a$, to form suitable openings for facilitating the tying-off of the bales. The press-box A is secured to the bottom timber, $A^2$, which forms the bed-piece for the entire press.

A plunger, B, is fitted to receive a reciprocating motion in the press-box, and it receives the requisite motion from a toggle-joint, composed of the lever C, arranged to vibrate on the main center-pin, $c$, and the connecting-bar C', pivoted to the lever C by the pin $c'$, and to the plunger B by the pin $b$. The jointed end of the lever C is rounded to an arc of a circle of which the pin $c'$ is the center, and the bar C' is provided with an anti-friction roller, $c^2$, arranged to bear against the rounded end of the lever.

The outer end of the lever C is provided with a clip, $c^3$, for receiving the detachable sweep D, (shown as broken off in the drawings,) and which may be made of any required length. Said sweep should be fitted at its outer end with a clevis arranged to swing from one side of the sweep to the other, so that the animals that are hitched thereto for the purpose of working the plunger can, without unhitching, be turned to travel back and forth to move the sweep D from one extremity of its movement to the other; and during each movement of said sweep its outer end will describe nearly a semicircular arc, and the parts of the toggle-joint and the plunger will move as follows: Starting (as an initial point) with the joint at $c'$ at the extremity of its throw outward at one side of the press, whereby the plunger B is drawn back to the extremity of its outward reciprocation, then, as the center joint of the parts C and C' is moved inward toward the center line of the press, the plunger B is forced forward to compress the material in the press-box A. This compressing movement continues until the pins $c$, $c'$, and $b$ of the parts C and C' are ranged in a direct line, at which point the compressing mechanism exerts its greatest power; then, as the joint continues its movement toward the opposite side of the press, the plunger B is thereby again retracted, so that when the toggle-joint has completed this phase of its movement a vacant space is left between the end of the plunger and the compressed material for receiving a fresh charge of material, and during the pause in the movement at this point (caused by the time occupied in turning the animals about) ample time is afforded for inserting the charge before the commencement of the reverse movement of the sweep to produce a repetition of the movements of the compressing mechanism just described. Thus each complete movement of the sweep D carries the parts of the toggle-joint from the point of their greatest protrusion at one side of the press to a like point at the opposite side, and causes the plunger B to first move inward to compress the material and then outward to put the press-box in condition for receiving a fresh charge; and it will be seen that by this arrangement a great saving of time is effected as compared with a press having a toggle-joint that only moves up to a center line and then back to its place of starting, for the reason that in the latter construction the time occupied by one of its pauses, while the motion is being reversed when the parts of the toggle-joint are in a direct line, is entirely lost, while in mine every pause is utilized for replenishing the charges.

The main center-pin $c$ receives the entire strain arising from the pressure applied by the plunger, and in order to resist this strain the said pin is secured at its lower end in the timber $A^2$, which forms the bed-piece of the press, and at its upper end it is held in position by one or more detachable braces, E, that are fastened to the head of the center pin, and from thence run back and upward to the top of the press-box, and are there hooked over and bolted to the cross-tie $e$, which engages behind the uprights at the front end of the press-box. By this mode of bracing the main center-pin to the press ample room is provided beneath the braces for the movements of the toggle-joint, and the center-pin and press-box are held together in such manner that neither of them can spring away from the other when the strain is applied.

By making the braces E detachable I am enabled to make a short press-box, and while the press-box and center-pin are thereby secured together, so that they afford mutual support to each other, ready access may be obtained to the underlying parts for the purpose of examination and repair by simply removing the braces from their place.

A feed-hopper, F, is fitted over the opening formed in the top of the press-box for introducing the hay or other material into the press.

In the top of the compressing or baling chamber $A'$, just behind the hopper, there is a device for retaining the charges of material that are forced into the baling-chamber. Said device consists of the yielding spring-yoke G, pivoted to the sides of the chamber and provided with the roller $g$, arranged to rotate in the front end of said yoke, and with a spring, $g'$, arranged at the opposite end of the yoke to depress the roller $g$, but permitting said roller to rise when occasion requires. A serrated cross-bar, $g^2$, is placed immediately behind the roller $g$, and is secured to the rear end of the spring-yoke by the bar $g^3$ in such manner that the said cross-bar can rise and fall independently of any movement of the spring-yoke. A spring, $g^4$, presses down the cross-bar $g^2$, but permits it to rise when needed. The teeth of the cross-bar $g^2$ project below the lower side of the roller $g$, and are bent backward so as to permit the material to pass freely under them when the plunger forces it into the baling-chamber; but on the return movement of the plunger the bent points of the teeth prevent the material from following the plunger. A chamber, $a'$, formed by chamfering off the end of the top piece, $A^3$, of the baling-chamber, immediately behind the serrated cross-bar $g^2$, permits the material to expand upward therein, and renders essential aid to said cross-bar in retaining the material from following the plunger on its return stroke.

The operation of this retaining device is as follows: The surplus material that usually overlaps the top of the plunger is forced by the inward movement of the plunger beneath the roller $g$ and serrated cross-bar $g^2$, both of which rise, as hereinbefore described, to allow the excessive quantity to pass into the baling-chamber; but as the plunger moves outward on its return stroke the hooked teeth of the cross-bar engage in the material and prevent it from following the plunger out of the baling-chamber.

In recesses at each side of the baling-chamber the side retainers H are arranged to slide on the studs $h$. Said retainers are provided on their inner faces with the projecting angles $h'$ and on their backs with the projecting angle $h^2$. All of said angles have their inclined faces arranged in relation to the plunger B as shown in Fig. 6. The arrangement of said retainers is such that as the material is forced into the baling-chamber it presses against the inclined faces of the angles $h'$, (which are then projecting into the baling-chamber,) and forces the retainers, by a positive movement, back into their recesses. Then as the plunger B continues its inward movement the hook-pieces $b'$, attached to each side of said plunger, engage with the angles $h^2$, thereby moving the retainers H inward by a positive motion and forcing the angles $h'$ to enter the recesses $b^2$, formed in the sides of the plunger B, so that when the plunger is drawn back the angles $h'$ will project into the baling-chamber in such manner as to retain the compressed material in place against any resilient tendency it may possess.

The top piece, $A^3$, of the baling-chamber is divided transversely, and the two parts are jointed together by one or more hinges, $a^2$. Over the rearmost part an adjusting-screw, I, is fixed for the purpose of adjusting the deflection of said part to regulate the size of the discharge-opening in the rear end of the baling-chamber, and thereby produce the required resistance to the passage of each bale through said opening to effect the proper degree of compression for the bales.

The separators J are used for the purpose of dividing the bales from each other. They are provided with channels $j$ for receiving the binding-slats that are secured on the ends of each bale. Each of said channels is provided with sharp spurs $j'$, on which the binding-slats are impaled before the separators are put in the press. The grooves $j^2$ are formed in the separators crosswise of the slat-channels for the purpose of passing the bale-ties over and behind the binding-slats in tying off the bales.

The auxiliary baling-chamber K is made with open ends corresponding in size to the transverse section of the baling-chamber of the press. It is composed of the bottom piece, $k$, end frames, $k'$, top piece, $k^2$, and side doors, $k^3$. The top piece, $k^2$, is loosely attached to the end frames, and is adapted to an up-and-down movement on the guide-pins L when the doors $k^3$ are open; but when the said doors are closed the lugs M, secured to the tops of the doors, engage over the top piece, $k^2$, and hold said top piece down flush with the top of the end openings. The bottom and top pieces of the said chamber are provided with grooves $k^4$, through which the ties for fastening the side binding-slats are passed. The doors $k^3$ are provided with channels $k^5$ for receiving the side binding-slats for the bale, and the said slats are impaled on the sharp spurs $k^6$, fixed in the channels $k^5$, and are held thereby while the slats are bound to the bale and until the doors $k^3$ are opened.

The chamber K is detachable from the press, and is only used when longitudinal slats are required on the bales, and it is then secured to the press by the fastenings N, which engage with the studs $n$, fixed in the rear end of the press.

The operation of this part of my invention is as follows: The side binding-slats are secured, as described, in the channels $k^5$, and the doors $k^3$ are closed and secured by the fastenings O. Then the bale, which has been previously compressed and bound endwise the baling-chamber of the press, is forced out of the discharge-openings of the press into the auxiliary chamber, where it is retained until the transverse ties are fastened around the bale. The doors $k^3$ are then thrown open to release the top piece, $k^2$, and leave the bale free, so that it can be readily thrown out of the chamber through one of the door-openings at the side of said chamber. Another set of the side slats is placed in the chamber $h^5$, the doors $k^3$ are closed, and the chamber is again in condition for a repetition of the operation just described.

It is obvious that the arrangement of the loose top piece, $k^2$, and doors $k^3$, provided with lugs M, to secure the said top piece in place when the doors are closed, as hereinbefore described, may be applied to the baling-chamber of a press, whether such baling-chamber is an integral part of the press or is made detachable therefrom.

Having thus described my invention, what I claim as new, and desire to secure by Letters Patent, is—

1. In a baling-press, the combination, with the press-box A and reciprocating plunger B, of a double-acting toggle-joint for imparting motion to said plunger, composed of the lever C, arranged to vibrate on the main center-pin $c$, and the connecting-bar C', pivoted to the plunger B and lever C, as described, and the sweep D, the said toggle-joint being adapted to move in such manner that its knuckle-joint at $c'$ will at each alternate motion protrude at opposite sides of the press, as herein specified.

2. In a baling-press, the combination, with the center-pin $c$ for the plunger-moving mechanism, having its lower end secured to the bed of the press, of one or more detachable braces, E, secured to the head of the pin $c$ and to the upper side of the press-box A, as and for the purpose herein specified.

3. In a baling-press, the combination, with the baling-chamber of the press and the plunger B, of the retaining device, consisting of the spring-yoke G, provided with the roller $g$ and serrated cross-bar $g^2$ and the springs $g'$ and $g^4$, as herein specified.

4. The retainers H, provided with angle-pieces $h'$ and $h^2$, in combination with the plunger B, provided with hook-pieces $b'$, adapted to co-operate with the angle-pieces $h^2$ and move the retainers H with a positive motion, as herein specified.

5. In a baling-press, the combination, with the reciprocating plunger B, of a toggle-joint composed of the lever C, arranged to vibrate on the center-pin c, and connecting-bar C', pivoted to the plunger B and lever C, as herein described, and the detachable sweep D, adapted to connect to the lever C, substantially as herein specified.

6. The separators J, having slat-channels j, provided with spurs j', and the tie-grooves j², as and for the purpose specified.

7. The detachable auxiliary baling-chamber K, adapted to receive a compressed and tied bale from a baling-press, in the manner and for the purpose herein specified.

ALEXANDER BUCKMAN.

Witnesses:
WILLIAM H. LOW,
C. J. MATTISON.